(12) United States Patent
Okawa et al.

(10) Patent No.: US 6,365,704 B1
(45) Date of Patent: Apr. 2, 2002

(54) POLYACETAL COPOLYMER

(75) Inventors: Hidetoshi Okawa; Kaoru Yamamoto, both of Fuji (JP)

(73) Assignee: Polyplastics Co., Ltd., Osaka (JP)

(*) Notice: Subject to any disclaimer, the term of this patent is extended or adjusted under 35 U.S.C. 154(b) by 0 days.

(21) Appl. No.: 09/869,807

(22) PCT Filed: Dec. 1, 2000

(86) PCT No.: PCT/JP00/08542

§ 371 Date: Jul. 5, 2001

§ 102(e) Date: Jul. 5, 2001

(87) PCT Pub. No.: WO01/42326

PCT Pub. Date: Jun. 14, 2001

(30) Foreign Application Priority Data

Dec. 10, 1999 (JP) .......................................... 11-352101
Dec. 10, 1999 (JP) .......................................... 11-352249

(51) Int. Cl.[7] ........................... C08G 12/26; C08G 2/22
(52) U.S. Cl. ..................... 528/249; 528/241; 528/250; 528/253; 528/232; 528/233; 525/472; 525/532
(58) Field of Search ................................ 528/232, 233, 528/241, 249, 250, 253; 525/472, 532

(56) References Cited

U.S. PATENT DOCUMENTS 5,183,860 A * 2/1993 Kashihara ................... 525/398

FOREIGN PATENT DOCUMENTS

JP  3-170526  7/1991
JP  8-12734   1/1996

* cited by examiner

Primary Examiner—Samuel A. Acquah
(74) Attorney, Agent, or Firm—Nixon & Vanderhye P.C.

(57) ABSTRACT

To provide a resin material in which various properties of a polyacetal resin such as excellent appearance, slidability and thermal stability are maintained and a rigidity is improved as well. That is, a polyacetal copolymer which is prepared by a copolymerization of 100 parts by weight of trioxane (A), 0.0005 to 2 parts by weight of the component (B), which is a compound (B-1) having at least three glycidyl groups in the molecule or a compound (B-2) having at least two epoxy groups in the molecule, and 0 to 20 parts by weight of a cyclic ether compound (C) copolymerizable with trioxane, and which has a total terminal group amount of 15 to 150 mmol/kg, when (B) is (B-2).

10 Claims, No Drawings

POLYACETAL COPOLYMER

TECHNICAL FIELD OF THE INVENTION

The present invention relates to a polyacetal copolymer having a high rigidity, an excellent creep property, a high surface hardness and an excellent slidability.

PRIOR ART

A polyacetal resin has excellent properties in mechanical property, thermal property, electric property, slidability, moldability, etc. and has been widely used mostly as structural materials, functional parts, etc. in electric instruments, car parts, precision machine parts, etc. However, as the field where a polyacetal resin is utilized is expanded, there is a tendency that the properties requested are becoming more and more high, complex and special. Among such requests, there is a demand for further improvement in rigidity while the excellent slidability, appearance, etc. which are inherent to polyacetal resin are still retained. For such a demand, a method where a fibrous filler or the like is filled in a polyacetal resin is common when the object is to just improve the rigidity. But, in this method, there is a problem of poor appearance, lowered slidability, etc. of the molded article as a result of filling the fibrous filler, etc. and, in addition, there is another problem of a lowered tenacity. It has been also known that, in a polyacetal copolymer, rigidity can be improved without a substantial deterioration of slidability and appearance by reducing the amount of a comonomer to be copolymerized. However, in a means where the amount of a comonomer is reduced, there are problems that not only tenacity lowers but also thermal stability of the polymer lowers, and the means does not always meet with the demand.

In view of such problems in the prior art, the present inventors presumed that, in order to improve the rigidity while various excellent properties inherent to polyacetal resin are retained, denaturation of the polymer skeleton per se of polyacetal resin and design of the resin composition based upon such a polymer hold the important key to the solution of the problems.

With regard to such a denaturation of the polymer skeleton per se of a polyacetal resin, JP-A 3-170526 discloses a modified polyacetal copolymer prepared by copolymerization of trioxane, at least one cyclic ether compound selected from ethylene oxide, 1,3-dioxolane, 1,3-dioxepane, 1,3,5-trioxepane and 1,3,6-trioxocane and at least one compound selected from glycidyl phenyl ether, styrene oxide and glycidyl naphthyl ether. However, an object of the modified polyacetal copolymers is to improve the moldability by an increase in crystallizing rate, particularly a high recycling ability and, further, according to the investigation by the present inventors, those copolymers have a poor thermal stability.

DISCLOSURE OF THE INVENTION

An object of the present invention is to solve the above-mentioned problems and to provide a resin material in which rigidity is improved while various properties of polyacetal resin such as excellent appearance, slidability and thermal stability are still retained.

The present inventors have carried out an intensive investigation for achieving the above object and have found that the above problems can be solved by a polyacetal copolymer wherein a branched and crosslinked structure is introduced by copolymerization of a specific polyfunctional compound whereupon the present invention has been achieved. They also have found that the above problems can be solved by a polyacetal copolymer wherein the amount of the terminal group is controlled whereupon the present invention has been achieved.

Thus, the present invention relates to a polyacetal copolymer which is prepared by a copolymerization of 100 parts by weight of trioxane (A), 0.0005 to 2 parts by weight of the component (B), which is a compound (B-1) having at least three glycidyl groups in the molecule or a compound (B-2) having at least two epoxy groups in the molecule, and 0 to 20 parts by weight of a cyclic ether compound (C) copolymerizable with trioxane, and which has a total terminal group amount of 15 to 150 mmol/kg, when (B) is (B-2).

It is preferable that the copolymerizing ratio of the cyclic ether compound (C) is 0.01 to 15 parts by weight and that a weight-average molecular weight of the polyacetal copolymer is 10,000 to 500,000.

The present invention further provides A process for producing a polyacetal copolymer by a copolymerization of 100 parts by weight of trioxane (A), 0.0005 to 2 parts by weight of a compound (B-2) having at least two epoxy groups in the molecule and 0 to 20 parts by weight of a cyclic ether compound (C) copolymerizable with trioxane using a cationic polymerization catalyst, wherein an alkoxy-containing compound is added so as to adjust the amount of the terminal group of the resulting polyacetal copolymer to 15 to 150 mmol/kg in total.

The present invention has a form in which the component (B) is (B-1) and a form in which the component (B) is (B-2). Thus, a polyacetal copolymer of the present invention is produced by a copolymerization of trioxane (A) and a compound (B-1) having at least three glycidyl groups in a molecule as essential components, preferably, to which a cyclic ether compound (C) copolymerizable with trioxane is further added. Another polyacetal copolymer of the present invention is prepared by a copolymerization of trioxane (A) and a compound (B-2) having at least two epoxy groups in the molecule as essential components, preferably, to which a cyclic ether compound (C) copolymerizable with trioxane is further added.

DETAILED DESCRIPTION OF THE INVENTION

As hereunder, the polyacetal copolymer of the present invention will be explained in detail.

Trioxane (A) which is used in the present invention is a cyclic trimer of formaldehyde. Usually it is prepared by the reaction of an aqueous solution of formaldehyde in the presence of an acidic catalyst and is used after purifying by means of distillation or the like. It is preferred that trioxane used for the polymerization is liquid and its temperature is 65 to 135° C.

Next, the compound (B-1) having at least three glycidyl groups in a molecule used in the present invention is preferably selected from a group consisting of triglycidyl ether compound and tetraglycidyl ether compound. Examples thereof include glycerol triglycidyl ether, trimethylolpropane triglycidyl ether, pentaerythritol tetraglycidyl ether, sorbitol polyglycidyl ether, sorbitan polyglycidyl ether, polyglycerol polyglycidyl ether and diglycerol polyglycidyl ether. Those compounds may be used for a copolymerization with trioxane (A) either solely or jointly by using two or more of them. In the present invention, the compound (B-1) having at least three glycidyl groups in a molecule is used within a range of 0.0005 to 2 parts by weight to 100 parts by weight of trioxane (A). It is used preferably within a range of 0.001 to 1 part by weight and, particularly preferably, within a range of 0.003 to 0.5 part by weight. When the amount of the component (B-1) used is less than 0.0005 part by weight, it is difficult to give a polyacetal copolymer having desired properties while, when it is more than 2 parts by weight, proccessability for molding, resistance to impact and surface properties of the resulting polyacetal copolymer lower and they are not preferred.

The component (B-2) used in the present invention is a compound having at least two epoxy groups in a molecule. Among that, a compound selected from a group consisting of diglycidyl ether compound, triglycidyl ether compound and tetraglycidyl ether compound is particularly preferred. Examples thereof include ethylene glycol diglycidyl ether, propylene glycol diglycidyl ether, 1,4-butanediol diglycidyl ether, hexamethylene glycol diglycidyl ether, resorcinol diglycidyl ether, bisphenol A diglycidyl ether, polyethylene glycol diglycidyl ether, polypropylene glycol diglycidyl ether, polybutylene glycol diglycidyl ether, glycerol triglycidyl ether, trimethylolpropane triglycidyl ether, pentaerythritol tetraglycidyl ether, sorbitol polyglycidyl ether, sorbitan polyglycidyl ether, polyglycerol polyglycidyl ether and diglycerol polyglycidyl ether. Those compounds may be used for a copolymerization with trioxane (A) either solely or jointly by using two or more of them. In the present invention, the compound (B-2) having at least two epoxy groups in a molecule is used within a range of 0.0005 to 2 parts by weight to 100 parts by weight of trioxane (A). It is used preferably within a range of 0.001 to 1 part by weight and, particularly preferably, within a range of 0.003 to 0.5 part by weight. When the amount of the component (B-2) used is less than 0.0005 part by weight, it is difficult to give a polyacetal copolymer having desired properties while, when it is more than 2 parts by weight, processability for molding, resistance to impact and surface properties of the resulting polyacetal copolymer lower and they are not preferred.

Examples of the cyclic ether compound (C) which is used in the present invention copolymerizable with trioxane (A) include ethylene oxide, propylene oxide, butylene oxide, epichlorohydrin, epibromohydrin, styrene oxide, oxetane, 3,3-bis(chloromethyl)oxetane, tetrahydrofuran, trioxepane, 1,3-dioxolane, propylene glycol formal, diethylene glycol formal, triethylene glycol formal, 1,4-butanediol formal, 1,5-pentanediol formal and 1,6-hexanediol formal. Among them, ethylene oxide, 1,3-dioxolane, diethylene glycol formal and 1,4-butanediol formal are preferred. When rigidity, resistance to chemicals, etc. of the resulting polyacetal copolymer are taken into consideration, the total amount of at least one member of the cyclic ether compound(s) (C) used to 100 parts by weight of trioxane (A) is 0 to 20 parts by weight, preferably 0.01 to 15 parts by weight and, particularly preferably, 0.1 to 10 parts by weight.

When the component (B) is (B-1), in the manufacture of the polyacetal copolymer of the present invention, a component which adjusts the molecular weight may be used in addition to the above-mentioned components. Examples of the component adjusting the molecular weight are chain-transfer agents which do not form an unstable terminal, i.e. alkoxy-containing compounds such as methylal, methoxymethylal, dimethoxymethylal, trimethoxymethylal and oxymethylene di-n-butyl ether. In the present invention, it is preferable that the amount of such a molecular weight regulator used is adjusted so that the molecular weight of the resulting polyacetal copolymer may be suitable.

When the component (B) is (B-2), in the manufacture of the polyacetal copolymer of the present invention, it is a characteristic feature that a component which adjusts the molecular weight is used in addition to the above-mentioned components whereby the amount of the terminal group is adjusted. Examples of the component adjusting the molecular weight are chain-transfer agents which do not form an unstable terminal, i.e. alkoxy-containing compounds such as methylal, methoxymethylal, dimethoxymethylal, trimethoxymethylal and oxymethylene di-n-butyl ether. In the present invention, the amount of such a molecular weight regulator used is adjusted whereby the total terminal group amount of the resulting polyacetal copolymer is adjusted to an extent of 15 to 150 mmol/kg or, preferably, 20 to 100 mmol/kg. When the total terminal group amount is too little, fluidity is significantly bad and a process such as injection molding is very difficult while, when the total terminal group amount is too much, a melt viscosity significantly lowers and it is impossible to prepare the pellets in a manufacturing step of extrusion, etc. or tenacity significantly lowers and they are not preferred.

In the manufacture of the polyacetal copolymer of the present invention comprising the above-mentioned monomer and comonomer components, a cationic polymerization catalyst is generally used as a catalyst. Specific examples thereof are at least one member of lead tetrachloride, tin tetrachloride, titanium tetrachloride, aluminum trichloride, zinc chloride, vanadium trichloride, antimony trichloride, phosphorus pentafluoride, antimony pentafluoride, boron trifluoride; coordination compound of boron trifluoride such as boron trifluoride diethyl etherate, boron trifluoride dibutyl etherate, boron trifluoride dioxanate, boron trifluoride acetic anhydrate and boron trifluoride triethylamine complex; inorganic and organic acids such as perchloric acid, acetyl perchlorate, tert-butyl perchlorate, hydroxyacetic acid, trichloroacetic acid, trifluoroacetic acid and p-toluenesulfonic acid; a complex salt compound such as triethyloxonium tetrafluoroborate, triphenylmethyl hexafluoroantimonate, allyldiazonium hexafluorophosphate and allyldiazonium tetrafluoroborate; an alkyl metal salt such as diethyl zinc, triethyl aluminum and diethylaluminum chloride; heteropolyacid and isopolyacid. Among them, boron trifluoride and a coordination compound of born trifluoride such as boron trifluoride diethyl etherate, boron trifluoride dibutyl etherate, boron trifluoride dioxanate, boron trifluoride acetic anhydrate and boron trifluoride triethylamine complex are particularly preferred. Such a cationic polymerization catalyst may be used as it is or may be used after diluting with an organic solvent or the like and there is no particular limitation for the method of manufacturing that.

Although there is no particular limitation for the process for the production of the polyacetal copolymer of the present invention, it is usually carried out by means of a bulk polymerization where liquefied trioxane (A), a compound (B-1) having at least three glycidyl groups in a molecule or a compound (B-2) having at least two epoxy groups in a molecule and a cyclic ether compound (C) are polymerized by mainly using a cationic polymerization catalyst to give a solid and bulky polymer. There is no particular limitation for the polymerization apparatus but known apparatus may be used and any of a batch method, a continuous method, etc. may be possible. The polymerization temperature is kept preferably at 65 to 135° C.

Deactivation of the catalyst after the polymerization is carried out by adding a basic compound or an aqueous solution thereof to the resulting reaction product discharged from a polymerization apparatus after the polymerization reaction or to the reaction product in the polymerization apparatus. As to a basic compound for neutralizing and deactivating the polymerization catalyst, ammonia, amines such as triethylamine, tributylamine, triethanolamine and tributanolamine, hydroxide salts of alkaline metal or alkaline earth metal and other known catalyst deactivators are used. It is preferred that, after the polymerization reaction, such an aqueous solution is quickly added to the product to inactivate. After such a polymerization method or a deactivation method, washing, separation/recovery of unreacted monomers, drying, etc. may be further carried out by known methods if necessary. In addition, a stabilizing treatment by a known method such as decomposition and removal of unstable terminal parts or sequestering of unstable terminal by a stabilizing substance is carried out if necessary and various necessary stabilizers are compounded. With regard to a stabilizer used here, one or more of hindered phenol compounds, nitrogen-containing compounds, alkaline or alkaline earth metal hydroxides, inorganic salts, carboxylates, etc. may be exemplified.

A weight-average molecular weight of the polyacetal copolymer comprising (B-1) prepared as above is preferably 10,000 to 500,000 or, particularly preferably, 20,000 to 100,000.

A weight-average molecular weight of the polyacetal copolymer comprising (B-2) is preferably 10,000 to 500,000 or, particularly preferably, 20,000 to 150,000. With regard to the terminal group, the amount of hemiformal detected by means of a $^1$H-NMR is preferably 0 to 4 mmol/kg or, particularly preferably, 0 to 2 mmol/kg. When it is more than 4 mmol/kg, there is a problem such as a foaming upon molding caused by decomposition of the polymer. In order to control the hemiformal terminal group amount within the above-mentioned range, it is preferred that the impurities, particularly water, in the total amount of monomers and comonomers used for the copolymerization are made 20 ppm or less or, particularly preferably, 10 ppm or less.

In addition, one or more of common additive(s) for thermoplastic resin such as coloring agent [e.g., dye and pigment], lubricant, nuclear agent, releasing agent, antistatic agent, surface-active agent, organic high-molecular material and inorganic or organic filler in a form of fiber, powder or plates may be further added to the polyacetal copolymer of the present invention.

EXAMPLES

Now, the present invention will be specifically illustrated by way of the following Examples although the present invention is not limited thereto. Evaluations in the Examples were carried out by the following methods.

[Tensile Strength]

A test piece of a dumbbell type was molded using an injection molding machine and the measurement was carried out in accordance with a method of ASTM D638.

[Bending Modulus]

A test piece was molded using an injection molding machine and the measurement was carried out in accordance with an ASTM method.

[Analysis of Terminal Group]

The polymer used for evaluation of physical properties was dissolved in hexafluoroisopropanol-d$_2$ and a $^1$H-NMR measurement was carried out. Quantitative determination was conducted from the peak area corresponding to each terminal.

Examples ①-1 to ①-9

A continuous mixing reactor constituted from a jacket for passing a hot/cold medium at the outside, a barrel having a shape where circles of two cross sections are partially overlap and rotating axes equipped with a paddle was used and, together with rotating each of two rotating axes having a paddle at 150 rpm, a bulk polymerization was carried out by a continuous supplying of trioxane (A), a compound (B-1) having at least three glycidyl groups in a molecule and a cyclic ether compound (C) in the ratio as shown in Table ①-1, and further, together with methylal as a molecular weight regulator and 0.005 part by weight of boron trifluoride as a catalyst to a polymerizing machine. The reaction product discharged from the polymerizing machine was quickly passed through a disintegrator and, at the same time, it was added to an aqueous solution of 60° C. containing 0.05% by weight of triethylamine so that the catalyst was deactivated. This was further separated, washed and dried to give a crude polyacetal copolymer. After that, to 100 parts by weight of this crude polyacetal copolymer were added 4 parts by weight of a 5% by weight aqueous solution of triethylamine and 0.3 part by weight of pentaerythrityl-tetrakis[3-(3,5-di-tert-butyl-4-hydroxyphenyl)propionate] followed by subjecting to melting and kneading at 210° C. using a biaxial extruder to remove the unstable parts. The structure and the copolymerizing composition of the resulting polyacetal copolymer were confirmed by means of a $^1$H-NMR measurement using hexafluoroisopropanol-d$_2$ as a solvent.

To 100 parts by weight of the polyacetal copolymer obtained by the above method were added 0.03 part by weight of pentaerythrityl-tetrakis[3-(3,5-di-tert-butyl-4-hydroxyphenyl)propionate] as a stabilizer and 0.15 part by weight of melamine followed by subjecting to melting and kneading at 210° C. using a biaxial extruder whereupon a polyacetal copolymer in a form of pellets was obtained. Results of the evaluation as evaluated by the above-mentioned methods are shown in Table ①-1.

Comparative Examples ①-1 to ①-3

A polyacetal copolymer having no branched crosslinking structure prepared without the use of a compound (B-1) having at least three glycidyl groups in a molecule was formed into pellets by the same manner as in Example ① and was evaluated. Results are shown in Table ①-1. In addition, a polyacetal copolymer was prepared using a large quantity of a compound (B-1) having three or more glycidyl groups in a molecule. The resulting copolymer had a high degree of crosslinking and a poor fluidity and its injection molding was impossible.

Examples ②-1 to ②-10

A continuous mixing reactor constituted from a jacket for passing a hot/cold medium at the outside, a barrel having a shape where circles of two cross sections are partially overlap and rotating axes equipped with a paddle was used and, together with rotating each of two rotating axes having a paddle at 150 rpm, a bulk polymerization was carried out by a continuous supplying of trioxane (A), a compound (B-2) having at least two epoxy groups in a molecule and a cyclic ether compound (C) in the ratio as shown in Table ②-1, and further, together with methylal as a molecular weight regulator and 0.005 part by weight of boron trifluoride as a catalyst to a polymerizing machine. Water contained in the monomer was 4 ppm in Examples ②-1 to ②-9 and 15 ppm in Example ②-10. Then, the reaction product discharged from the polymerizing machine was quickly passed through a disintegrator and, at the same time, it was added to an aqueous solution of 60° C. containing 0.05% by weight of triethylamine so that the catalyst was deactivated. This was further separated, washed and dried to give a crude polyacetal copolymer. After that, to 100 parts by weight of this crude polyacetal copolymer were added 4 parts by weight of a 5% by weight aqueous solution of triethylamine and 0.3 part by weight of pentaerythrityl-tetrakis[3-(3,5-di-tert-butyl-4-hydroxyphenyl)propionate] followed by subjecting to melting and kneading at 210° C. using a biaxial extruder to remove the unstable parts. The structure and the copolymerizing composition of the resulting polyacetal copolymer were confirmed by means of a $^1$H-NMR measurement using hexafluoroisopropanol-$d_2$ as a solvent.

To 100 parts by weight of the polyacetal copolymer obtained by the above method were added 0.03 part by weight of pentaerythrityl-tetrakis[3-(3,5-di-tert-butyl-4-hydroxyphenyl)propionate] as a stabilizer and 0.15 part by weight of melamine followed by subjecting to melting and kneading at 210° C. using a biaxial extruder whereupon a polyacetal copolymer in a form of pellets was obtained. Results of the evaluation as evaluated by the above-mentioned methods are shown in Table ②-1.

Comparative Examples ②-1 to ②-5

In Comparative Examples ②-1 to ②-3, polyacetal copolymers were prepared without a compound (B-2) having 2 or more epoxy groups in a molecule while, in Comparative Examples ②-4 and ②-5, they were prepared by changing the amount of methylal and then made into polyacetal copolymers in the form of pellets by the same manner as in the Examples followed by the evaluations. Results are shown in Table ②-1.

TABLE 1-1

| | Polyacetal Copolymer; Composition of the Polymer | | | | | | |
|---|---|---|---|---|---|---|---|
| | Trioxane (A) | Component (B) | | Component (C) | | Tensile | Bending |
| | Parts by Weight | Type | Parts by Weight | Type | Parts by Weight | Strength (MPa) | Modulus (MPa) |
| Examples | | | | | | | |
| 1 | 100 | PETGE | 0.200 | DO | 1.7 | 72 | 3200 |
| 2 | 100 | TPTGE | 0.034 | DO | 1.7 | 71 | 3060 |
| 3 | 100 | TPTGE | 0.068 | DO | 1.7 | 71 | 3040 |
| 4 | 100 | TPTGE | 0.350 | DO | 1.7 | 70 | 3160 |
| 5 | 100 | GTGE | 0.034 | DO | 1.7 | 70 | 3050 |
| 6 | 100 | TPTGE | 0.068 | DO | 1.7 | 66 | 2750 |
| 7 | 100 | TPTGE | 0.034 | DO | 1.7 | 67 | 3050 |
| 8 | 100 | GTGE | 0.034 | DO | 1.7 | 67 | 3120 |
| 9 | 100 | TPTGE | 0.068 | DO | 3.3 | 66 | 2750 |
| Com. Ex. | | | | | | | |
| 1 | 100 | — | — | DO | 1.7 | 62 | 2680 |
| 2 | 100 | — | — | DO | 3.3 | 61 | 2230 |
| 3 | 100 | TPTGE | 3.0 | DO | 1.7 | * | * |

(Notes:
Full names and details of the abbreviations used in Table ①-1)
PETGE: Pentaerythritol tetraglycidyl ether
TPTGE: Trimethylolpropane triglycidyl ether
GTGE: Glycerol triglycidyl ether
DO: 1,3-dioxolane
*: Molding impossible

What is claimed is:

1. A polyacetal copolymer which is prepared by a copolymerization of 100 parts by weight of trioxane (A), 0.0005 to 2 parts by weight of the component (B), which is a compound (B-1) having at least three glycidyl groups in the molecule or a compound (B-2) having at least two epoxy groups in the molecule, and 0 to 20 parts by weight of a cyclic ether compound (C) copolymerizable with trioxane, and which has a total terminal group amount of 15 to 150 mmol/kg, when (B) is (B-2).

2. The polyacetal copolymer according to claim 1, wherein the copolymerizing ratio of the cyclic ether compound (C) is 0.01 to 15 parts by weight.

3. The polyacetal copolymer according to claim 1, wherein a weight-average molecular weight of the polyacetal copolymer is 10,000 to 500,000.

4. The polyacetal copolymer according to claim 1, comprising (B-1) as the component (B), wherein the compound (B-1) having at least three glycidyl groups in the molecule is at least one compound selected from the group consisting of glycerol triglycidyl ether, trimethylolpropane triglycidyl ether and pentaerythritol tetraglycidyl ether.

5. The polyacetal copolymer according to claim 1, comprising (B-2) as the component (B), wherein the amount of the terminal group is 20 to 100 mmol/kg in total.

6. The polyacetal copolymer according to claim 1, comprising (B-2) as the component (B), wherein the component (B-2) is a compound having two glycidyl groups in the molecule.

7. The polyacetal copolymer according to claim 1, comprising (B-2) as the component (B), wherein the component (B-2) is a compound having at least three glycidyl groups in the molecule.

8. The polyacetal copolymer according to claim 1, comprising (B-2) as the component (B), wherein the amount of a hemiformal terminal group is 4 mmol/kg or less.

9. The polyacetal copolymer according to claim 7, comprising (B-2) as the component (B), wherein the compound (B) having at least two epoxy groups in the molecule is at least one compound selected from the group consisting of 1,4-butanediol diglycidyl ether, glycerol triglycidyl ether, trimethylolpropane triglycidyl ether and pentaerythritol tetraglycidyl ether.

10. A process for producing a polyacetal copolymer by a copolymerization of 100 parts by weight of trioxane (A), 0.0005 to 2 parts by weight of a compound (B-2) having at least two epoxy groups in the molecule and 0 to 20 parts by weight of a cyclic ether compound (C) copolymerizable with trioxane using a cationic polymerization catalyst, wherein an alkoxy-containing compound is added so as to adjust the amount of the terminal group of the resulting polyacetal copolymer to 15 to 150 mmol/kg in total.

* * * * *